UNITED STATES PATENT OFFICE.

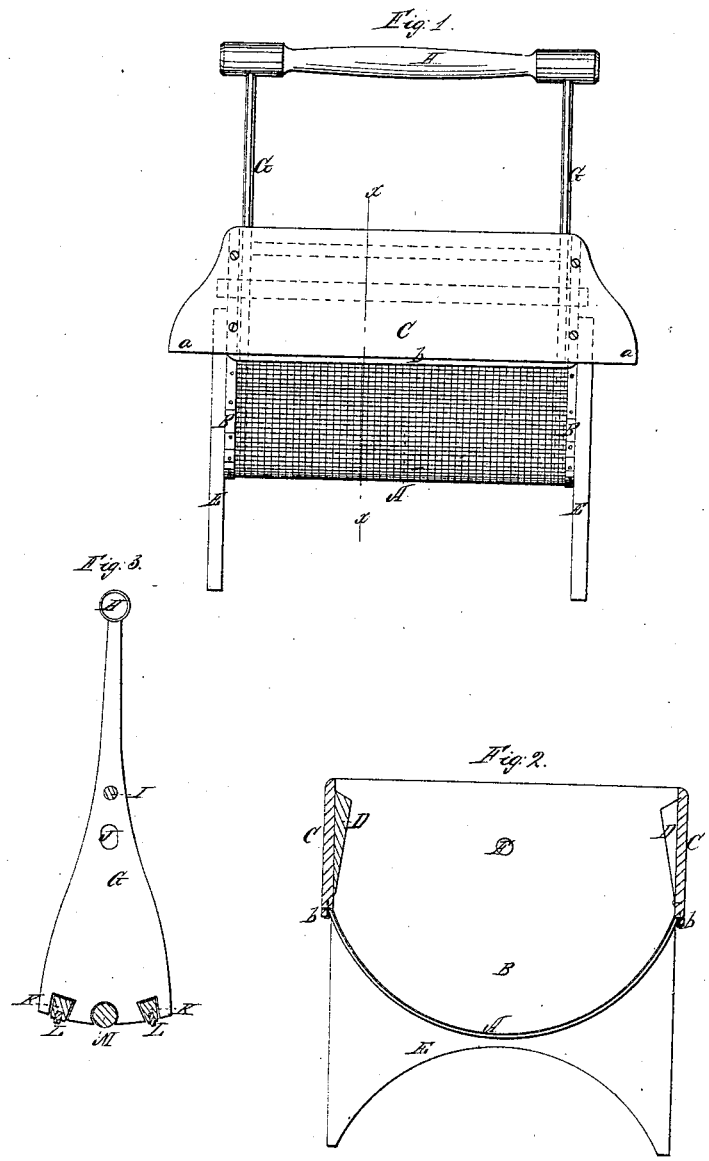
A. E. & J. B. Blood,
Flour Sieve.
N° 51,992.  Patented Jan. 9, 1866.

A. E. BLOOD AND J. B. BLOOD, OF LYNN, ASSIGNORS TO THEMSELVES AND E. D. GOODRICH, OF CAMBRIDGE, MASSACHUSETTS.

FLOUR-SIFTER.

Specification forming part of Letters Patent No. 51,992, dated January 9, 1866.

*To all whom it may concern:*

Be it known that we, A. E. BLOOD and J. B. BLOOD, of Lynn, in the county of Essex and State of Massachusetts, have invented a new and useful Improvement in Sifters; and we do hereby declare that the following is a full, clear, and exact description of the construction and operation of the same, reference being had to the accompanying drawings, forming a part of this specification, in which—

Figure 1 is a front elevation. Fig. 2 is a vertical section in the line $xx$ of Fig. 1; and Fig. 3 is a side view of one of the vibrating levers, G, showing the ends of the scrapers K and roller M.

Like parts are indicated by the same letters in all the drawings.

Our present invention is intended more particularly as an improvement on the patent granted to us September 17, 1861; and it consists, first, in providing the vibrating levers G G with oblong slots J J for the reception of the fulcrum-pin F, so that said levers, with their appendages, may be susceptible of a slight movement toward and from the sieve, whereby more or less pressure may be applied to the latter by the operator at pleasure; second, in arranging the scrapers K or rollers M at the bottom of the levers G G in oblong slots, or in slots somewhat larger than the ends of the said scrapers and rollers, so that the latter may rise and fall a little and bear with only their own weight upon the sieve, and also be readily removed or inserted when required; third, providing the bottom of the scrapers K with a strip, L, of leather, rubber, or other suitable yielding material, so as to fit close to the sieve or bear upon it without producing too much wear and friction; fourth, in the employment of one or more revolving cylinders, M, in place of the scrapers K K, or in combination with them, the design of said cylinder or cylinders being to roll over lumps, instead of pushing them along, and also to produce less wear and friction on the sieve; fifth, in the combination of the overhanging deflectors D D with the vertical sides C C, instead of forming the deflectors (as in our patent alluded to above) by means of the curved tin continuations of the sieve; sixth, in extending the side pieces, C, so as to form rests $a\ a$ for supporting the sifter on the receptacle for the sifted material, instead of constructing them (as in our former patent) of separate strips or cleats attached to the periphery of the cylindrical box.

To enable others skilled in the art to make and use our improvement, we will now proceed to describe the construction and operation of the same.

A is the sieve, of iron wire or other suitable material, in general use for sifting flour, &c.

B B are the two side pieces, of board, the under portion of which, as shown in Fig. 2, is formed to the arc of a circle whose center is at F. To the curved edges of these side pieces the sieve A is confined by means of nails or screws driven through a narrow band of sheet-tin or other suitable material, as seen in Fig. 1.

E E are the legs, consisting of pieces of board shaped as shown in Fig. 2, and confined by screws or nails to the outer sides of the side pieces, B B.

C C are the two vertical end pieces, of board, attached to the side pieces, B B, by means of screws or nails, and having wings $a\ a$, which project beyond the sides of the sieve for the purpose specified above. To the under edges of these vertical pieces C C the upper edges of the sieve A are confined by means of a cleat, $b$, and nails, or in any other suitable and obvious manner.

D D are the overhanging deflectors, of wood, tin, or other suitable material, attached to the vertical end pieces, C C, as shown in Fig. 2, and extending from side to side of the box. These deflectors prevent the flour from being thrown out over the edges of the side boards of the sifting-machine, and also cause the flour to be deflected toward the center of the concave sieve.

G G are vibrating levers, of wood or metal, and shaped as clearly shown in Fig. 3. The upper ends of these levers are connected by the bar H, which also forms the handle by means of which the sifter is operated.

I is another rod, parallel with the handle H, connecting the two levers G G near their center, as shown in Fig. 2 and by the dotted lines in Fig. 1. Through each lever G is an oblong slot, J, (see Fig. 3,) through which and the sides B B is passed the round rod F, which forms the fulcrum on which said levers vibrate.

K K are scrapers extending across the sieve A, having their ends confined in slots through the lower ends of the levers G G, as shown in Fig. 3.

M is a cylinder, of wood or metal, the ends of which revolve in slots in the bottom of the levers G G, as represented in Fig 1. This cylinder, as well as the scrapers, fits loosely in the slots in the levers, so as to be susceptible of a slight movement toward or from the fulcrum F, and for the purpose specified above.

L L are strips of leather, rubber, or other suitable yielding material, fitted in grooves in the bottom of the scrapers K K, as shown in Fig. 3, and for the purpose mentioned above.

In the drawings, Fig. 3, two scrapers and one cylinder are shown. We do not, however, confine ourselves to any particular number or order. In some cases we may use only cylinders and in others only scrapers; or a single scraper or roller might be used, if required. Two or three, however, work to better advantage.

The operation of our machine, being similar to that of the one patented by us in 1861, we need not now describe.

What we claim as new, and desire to secure by Letters Patent, is—

1. The combination of the finely-perforated concave or sieve A and levers G G, constructed with oblong slots J J, and with a pressure device, M, or its equivalent, substantially in the manner and for the purpose described.

2. Arranging the scrapers K and rollers M at the bottom of the levers G G in oblong slots, or in slots somewhat larger than the ends of said scrapers and rollers, substantially as and for the purpose described.

3. Providing the bottom of the scrapers K with a strip of leather or other suitable yielding material, substantially as and for the purpose shown.

4. The revolving cylinder or cylinders M, when combined with a sieve and operating with a rolling pressure upon the flour which is placed upon said sieve to be sifted, substantially as and for the purpose set forth.

5. The arrangement of the deflectors D, in combination with the concave sieve and pressure device G G M, or its equivalent, substantially as and for the purpose set forth.

ABIJAH E. BLOOD.
J. B. BLOOD.

Witnesses:
L. B. KING,
C. L. PAUL.